United States Patent [19]

Mukai et al.

[11] Patent Number: 5,264,521
[45] Date of Patent: Nov. 23, 1993

[54] RUBBER COMPOSITIONS

[75] Inventors: Uchu Mukai, Kodaira; Masanori Kawamura, Higashiyamato; Kazuhide Sato, Koadaira, all of Japan

[73] Assignee: Bridgestone Corporation, Tokyo, Japan

[21] Appl. No.: 846,451

[22] Filed: Oct. 7, 1991

Related U.S. Application Data

[63] Continuation-in-part of Ser. No. 513,474, Apr. 23, 1990, abandoned.

[30] Foreign Application Priority Data

Apr. 28, 1989 [JP] Japan ................................ 1-107795

[51] Int. Cl.$^5$ ............................................. C08K 3/04
[52] U.S. Cl. ...................... 524/496; 524/495; 524/847
[58] Field of Search .................. 422/150; 423/445; 524/495, 496, 847

[56] References Cited

U.S. PATENT DOCUMENTS

| | | | |
|---|---|---|---|
| 4,075,160 | 2/1978 | Mills et al. | 423/445 |
| 4,228,143 | 10/1980 | Cheng et al. | 423/445 |
| 4,503,027 | 3/1985 | Cheng | 422/150 |
| 4,548,980 | 10/1985 | Nagata | 524/496 |

*Primary Examiner*—Paul R. Michl
*Assistant Examiner*—Peter Szekely
*Attorney, Agent, or Firm*—Sughrue, Mion, Zinn, Macpeak & Seas

[57] ABSTRACT

A rubber composition comprises natural rubber and/or a diene based synthetic rubber, and carbon black. The carbon black has characteristics that a line-width $\Delta H$ (mT) in an electron spin resonance (ESR) satisfies $\Delta H(mT) \geq 0.11T - 7.56 + 5$ in which T is a colored transmittance (%) falling in a range of 100–60%, and an $N_2SA$ value of the carbon black is not less than 114 m$^2$/g to 250 m$^2$g.

7 Claims, 2 Drawing Sheets

FIG_1
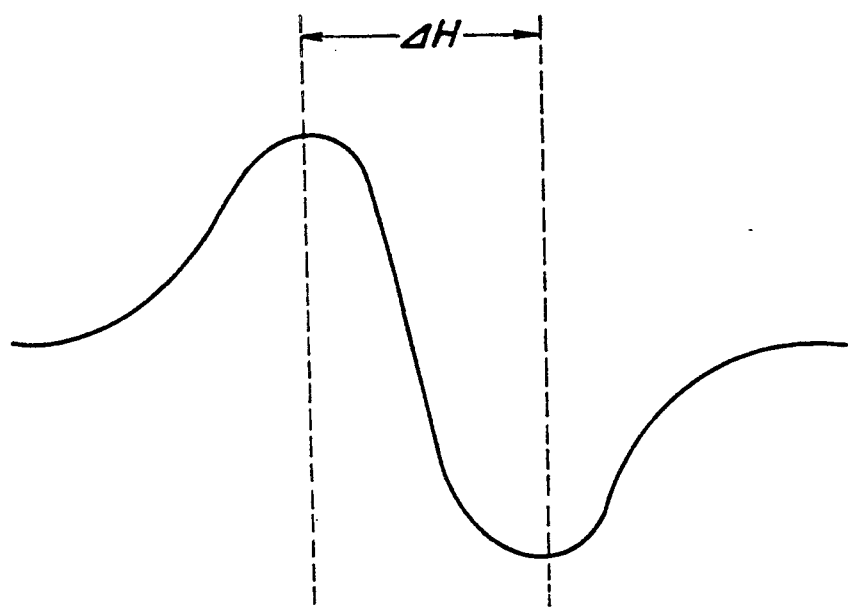

FIG._2a
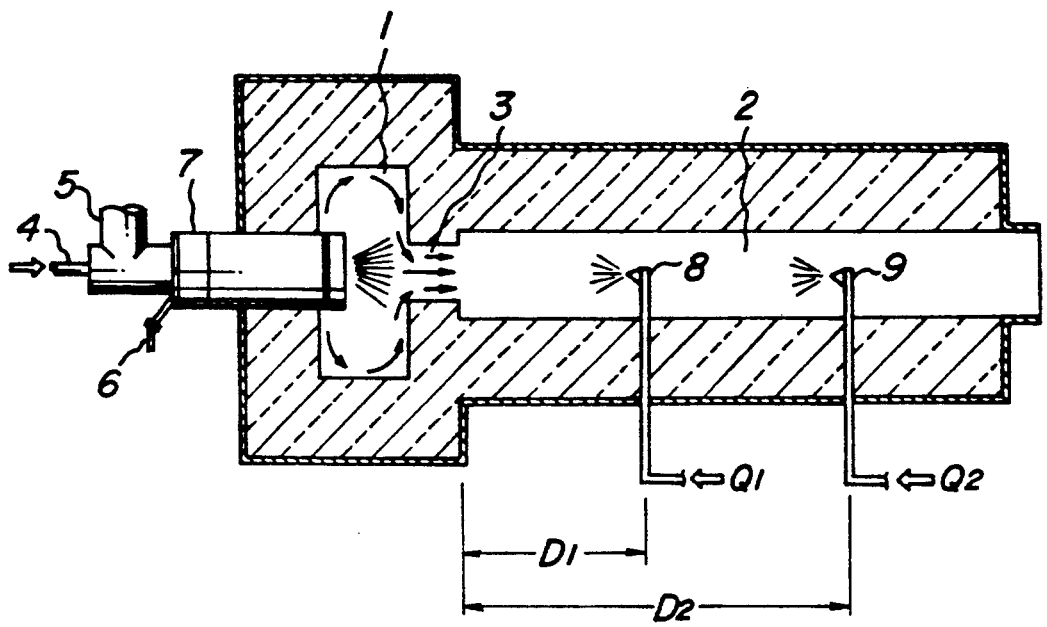
FIG._2b
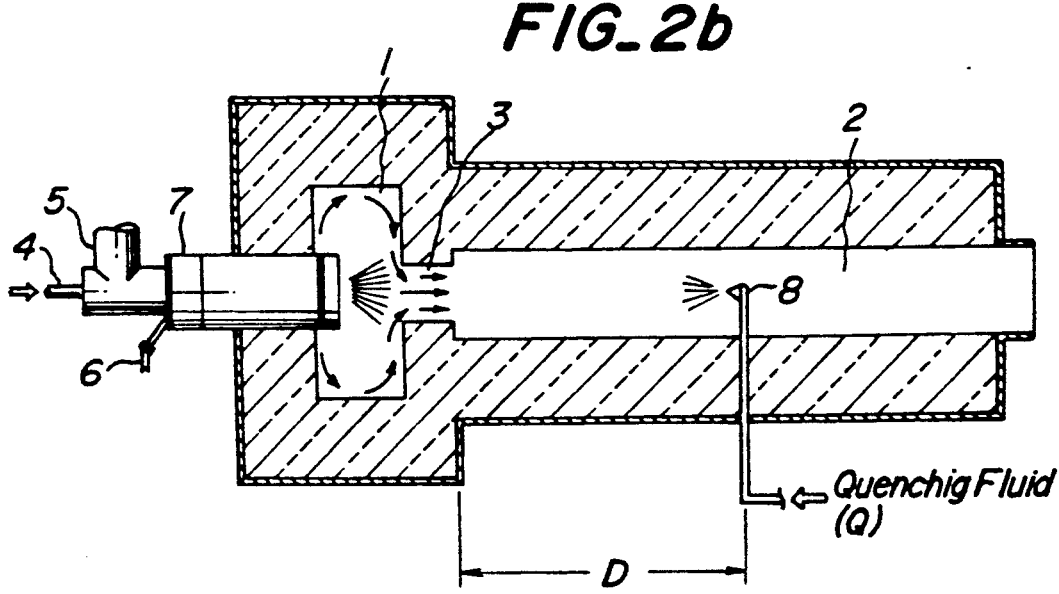
$$Q = Q_1 + Q_2$$
$$D = \frac{Q_1 \times D_1 + Q_2 \times D_2}{Q_1 + Q_2}$$

RUBBER COMPOSITIONS

This application is a continuation-in-part application of U.S. Patent Application Ser. No. 07/513,474, filed Apr. 23, 1990, abandoned.

BACKGROUND OF THE INVENTION

1. Field of the Invention

The present invention relates to a rubber composition for tires, hoses, conveyor belts and the like and which has an improved reinforcing property, particularly improved heat generation and processability.

2. Related Art Statement

Carbon blacks such as ISAF or the like, possessing highly reinforcing ability have formerly been used for rubber compositions in treads of tires for trucks and buses, and the like in which considerably high wear resistance is required. In recent years, as the demand for economy has become greater in the market, it is important to attain higher wear resistance from the standpoint of the determination of product value.

In order to improve wear resistance, the compounding recipe is varied, for instance, the compounding ratio of carbon black is increased or the amount of a softener such as a process oil is decreased, or, alternatively, SAF grade carbon black having an excellent reinforcing ability is used instead of ISAF grade carbon black.

However, if the compounding ratio of carbon black is increased, the wear resistance is indeed improved within a certain range of the compounding ratio. But, as the compounding ratio increases, demerits become greater. For example, with an increase in the compounding ratio, the effect obtained gradually decreases, and the wear resistance of the rubber composition lowers.

On the other hand, if the ratio of the softening agent such as process oil is decreased, tacking of the kneaded rubber composition becomes poorer, although the wear resistance is improved. In addition, the viscosity of the rubber increases. Thereby, operability is deteriorated to a large extent.

Further, when the SAF grade carbon black is used, operability becomes poorer due to increased viscosity, although wear resistance is improved.

Under the circumstances, although various investigations have been made with respect to extension of the rubber-kneading time period and production techniques, sufficient effects could not be obtained prior to the present invention.

SUMMARY OF THE INVENTION

Therefore, it is an object of the present invention to provide a rubber composition which has low heat generation, high reinforcing ability, and particularly high wear resistance without deteriorating operability due to increased viscosity.

The present inventors have repeatedly made strenuous studies and investigations to solve the above-mentioned problems, and they have reached the conclusion that ISAF grade carbon black and SAF grade carbon black which satisfy specified characteristic requirements are effective for solving the above problems. The inventors have accomplished the invention based on this conclusion. As the ISAF grade carbon and the SAF grade carbon, N110 (SAF) and N220 (ISAF) may be recited.

That is, the present invention relates to the rubber composition comprising natural rubber and/or a diene based synthetic rubber and carbon black, wherein the carbon black has a characteristic that a line-width $\Delta H$ (mT) in an electron spin resonance spectrum (ESR) satisfies $\Delta H$ (mT)$\geq 0.11T-7.56+5$ in which mT and T are militesla and a toluene discoloration (%) falling in a range of 100-60%, respectively, and that an $N_2SA$ value (a nitrogen-adsorbing specific surface area) $(m^2/g)$ is not less than 114 $m^2/g$ but not more than 250 $m^2/g$. The line-width in the ESR is defined as $\Delta H$ which is a distance between peaks in the ESR spectrum.

As examples of the diene based synthetic rubber which is one of the rubber components in the present invention, a synthesized polyisoprene rubber, a polybutadiene rubber, a styrene butadiene rubber, etc. may be recited. Each of these rubbers may be used singly or in combination with other.

The carbon black used in the present invention is novel, and can be produced by a tunnel-type reactor including a combustion section 1, a reaction zone 2 and a choke section 3 between the combustion section and the reaction zone as shown in FIG. 2a. The combustion section and the reaction zone have larger and smaller diameters, respectively, and the chock section has a diameter smaller than that of the reaction zone. Hydrocarbon feed stock, fuel and air are introduced through lines 4, 5, and 6, respectively and injected into the combustion zone through an injection assembly 7. A quench liquid such as water is sprayed into the reaction zone at two points (sprayers) 8 and 9 spaced from the influent end toward the effluent end, and quenching is controlled such that an amount of the quench liquid sprayed through the upstream point 8 is made greater than that of the quench liquid sprayed through the downstream point 9. In the quenching, the quench liquid is sprayed into the reaction zone through the sprayers 8, 9 in a direction opposite to the combustion stream.

The carbon black according to the present invention is preferably used in an amount of 30-80 PHR.

These and other objects, features and advantages of the invention will be appreciated upon reading of the invention when taken in conjunction with the attached drawing, with the understanding that some modifications, variations and changes of the same could be made by the skilled person in the art to which the invention pertains without departing from the spirit of the invention or the scope of claims appended hereto.

BRIEF DESCRIPTION OF THE DRAWING

For a better understanding of the invention, reference is made to the attached drawings, wherein:

FIG. 1 is a diagram showing the ESR spectrum; and

FIGS. 2a and 2b are sectional views of a carbon black-manufacturing equipment to be used for the production of carbon black for the present invention and conventional carbon black, respectively.

DETAILED DESCRIPTION OF THE INVENTION

In the following, carbon black as the main ingredient of the present invention will be explained.

First, carbon black is required to have the characteristic that the line-width $\Delta H$ (mT) in the ESR satisfies $\Delta H$ (mT)$\geq 0.11T-7.56+5$. This is for the following reasons:

It is said that as the firing temperature and time increase, the line-width of the fired product in the ESR measurement is greater. In such a case, the toluene discoloration T approaches 100%. In general, carbon black having a low toluene discoloration has excellent affinity with a polymer, and attains both high reinforcing ability and low heat generation as the physical properties of the rubber composition. However, since the graphitization degree of such a carbon black is low, this carbon black itself has a defect in the reinforcement. That is, when T is smaller than 60%, grains themselves of the carbon black become brittle to in turn adversely affect the rubber-reinforcing ability. The carbon black according to the present invention is a carbon black capable of overcoming the above-mentioned contradictory properties. This carbon black has excellent affinity with the polymer at its surface, and also has the structure in which graphitization proceeds. The requirement to be satisfied by the carbon black is the relationship given above. T is preferably not more than 95%, which has empirically determined.

The carbon black to be used in the present invention is required to have an $N_2SA$ value of not less than 114 $m^2/g$ but not more than 250 $m^2/g$. If it is less than 114 $m^2/g$, sufficient wear resistance cannot be obtained. On the other hand, if it is more than 250 $m^2/g$, kneading becomes impossible.

Next, it is preferable that the carbon black according to the present invention has a CTAB value (cetyltrimethyl ammonium bromide-absorbed amount) of not less than 105 $m^2/g$. This is because if the CTAB value is less than 105 $m^2/g$, the carbon black may have poorer reinforcing ability as compared with currently used carbon blacks.

The carbon black according to the present invention preferably has a $_{24}M_4$ DBP oil-adsorbed amount (an amount of dibutylphthalate adsorbed onto carbon black after it is compressed at four times at 24,000 psi) of not less than 85 ml/100 g. This is because if the value is less than 85 ml/100 g, the rubber composition added with the carbon black has poorer wear resistance, particularly at a high severity zone.

Further, in the carbon black according to the present invention, the $N_2SA$ value preferably differs from the CTAB value by not more than 10 $m^2/g$. The reason is that if the difference is greater than 10 $m^2/g$, the number of fine pores in the surface of the carbon black increases so that the viscosity of the compounded rubber increases, the reinforcing ability is deteriorated due to poor dispersion, and in turn the wear resistance becomes insufficient.

As a matter of course, compounding agents ordinarily used in the rubber industry, such as a reinforcing filler, a vulcanizing agent, a vulcanization accelerator, a vulcanization accelerator aid, and an antioxidant may appropriately be added.

In the following, the present invention will be explained in more detail with reference to Examples and Comparative Examples.

First, methods for measuring the characteristic values of carbon black and those for measuring physical properties of the rubber will be explained.

(A) Methods for measuring the characte carbon black

The toluene discoloration was measured according to JIS K 6221-1982.

The toluene discoloration-measuring process in ASTM D 1618-83, is basically as follows:

$2.00 \pm 0.01$ g of a dried sample pulverized in a mortar is precisely taken in a 100 ml Erlenmayer flask (JIS 3503), 20 ml toluene is added thereto, and a ground stopper is fitted to the flask. Immediately thereafter, the content is vigorously shaken by hand or a machine for 60-110 seconds. (In the present invention, the shaking is effected for 60 seconds). Immediately after the shaking, the content is placed onto a filter paper-fitted glass funnel preliminarily set in another Erlenmayer flask. Immediately after the filtration, the funnel is removed, and a stopper is fitted to the flask.

After an absorbing cell is washed with a part of the filtrate three times, the cell is filled with the filtrate, and transmittance of the filtrate is measured at a wavelength of $420 \pm 5$ nm by a photoelectric photometer or a spectrometer. Measurement results are shown by %. In every measurement, toluene having been preliminarily filtered is used, and adjustment is performed to make its transmittance equal to 100 at $420 \pm 5$ nm.

The CTAB value was measured according to ASTM D 3765-85.

The $_{24}M_4$DBP oil-adsorbed amount was measured according to ASTM D 3493-84.

The $N_2SA$ value was measured according to ASTM D-3037-84B.

An electron spin resonance apparatus JES-RE 2X (JEOL, Ltd.) was used as the ESR, and measurements were effected under the following conditions.

| Measurement temperature | 25° C. |
| --- | --- |
| Power | 1 mW |
| Center field | 331 mT |
| Sweep width | 150 mT (331 ± 75 mT) |
| Sweep time | 12 min |
| Field modulation | 100 KHz |
| Field modulation width | 2 mT |
| Time constant | 1 sec |

As mentioned before, the line-width is the ESR was defined as $\Delta H$ which was taken as a difference between peaks in the ESH spectrum (see FIG. 1).

(B) Method for measuring rubber properties

The Mooney viscosity was measured according to JIS 6300-1974. The wear resistance index representing wear resistance was obtained by measuring the worn loss amount with use of a Lambourn tester and effecting calculation according to the following expression.

$$\text{Wear resistance index} = \frac{\text{Volume loss amount of control}}{\text{Volume loss amount of test piece}} \times 100$$

Note:
Comparative Example 1 was taken as control in Examples 1 and 2.
Comparative Example 2 was taken as control for Example 3.
Comparative Example 3 was taken as control for Examples 4 and 5.
Comparative Example 4 was taken as control for Examples 6 and 7.
Comparative Example 5 was taken as control for Example 8.

The tan $\delta$ value representing the heat generating characteristic was measured with the use of a viscoelastic spectrometer manufactured by Iwamoto Seisakusho Corporation under conditions that tensile dynamic strain, frequency, and temperature were 1%, 50 Hz, and 25° C., respectively. Slab sheets having the thickness of about 2 mm and the width of 5 mm were used as test pieces, and a span between holding points of the test pieces and an initial load were 2 cm and 100 g, respectively. The lower the tan $\delta$, the lower the heat generation.

By using the carbon black-producing equipment shown in FIGS. 2a and 2b, carbon blacks according to the present invention and a conventional method were produced, respectively. In the present invention, it is important to spray the quench liquid into the reaction zone through the sprayers at two locations spaced in a flowing direction, in a direction opposite to the combustion stream. If the quench liquid is sprayed in the same direction as the combustion stream, contacting efficiency between the combustion stream and the quench liquid decreases, so that the discoloration value increases, and the line width becomes smaller. In FIG. 2b, the same reference numerals denote the same constituent parts as in FIG. 2a. FIG. 2b differs from FIG. 2a only in that the quench liquid is sprayed into the reaction section through a single position 8. In the apparatuses of FIGS. 2a and 2b, the combustion section, the chock section and the reaction section had the dimensions, 700 mm in diameter ×450 mm in length, 110 mm in diameter ×150 mm in length, and 220 mm in diameter ×8,000 mm in length, respectively.

Producing conditions are given in Table 1 together with line-width in ESR (mT), Toluene discoloration T (%) and $N_2SA$ ($m^2/g$), and physical and chemical properties of hydrocarbon feed stock used are given in Table 2.

TABLE 2

| | | | |
|---|---|---|---|
| Specific gravity (JIS K 2249) (15/4° C.) | 1.1310 | Distillation characteristics (°C.) | |
| Kinematic viscosity (JIS K 2283) (cSt AT 50° C.) | 16.8 | Initial distillation point | 202 |

TABLE 2-continued

| | | | |
|---|---|---|---|
| Content of water (JIS K 2275) (%) | 0.3 | (Initial boiling point) 10 vol % | 239 |
| Residual carbon (JIS K 2275) (%) | 9.5 | 30 vol % | 292 |
| Sulfur content (JIS K 2275) (%) | 0.5 | 50 vol % | 339 |
| Amount of carbon (wt %) | 90.2 | | |
| Amount of water (wt %) | 5.4 | | |
| BMCI | 160 | | |

*BMCI: Bureau of Mines Correlation Index

Rubber composition having the respective compounding recipes shown in below Table 3 were separately kneaded by a Nanbury mixer using carbon blacks having different properties, and their Mooney viscosities were measured. Further, the wear resistance indexes and the tan δ value of vulcanization obtained at 145° C. for 30 minutes were evaluated by measurement. Results are shown in Table 4.

TABLE 3

| Compounding recipe of test pieces | |
|---|---|
| Ingredients | Ratio Parts by weight |
| Polymer | 100 |
| Carbon black | 50 |
| Stearic acid | 3.0 |
| Zinc oxide | 4.0 |
| Antioxidant *1 | 1.0 |
| Vulcanization accelerator *2 | 0.5 |
| Sulfur | 2.5 |

*1 N-phenyl-N'-isopropyl-p-phenyldiamine
*2 N-oxydiethylene-2-benzothiazole sulfenamide

TABLE 1

| | | Comparative Example A | Example B | Example C | Comparative Example D | Example E | Comparative Example F | Example G |
|---|---|---|---|---|---|---|---|---|
| Line-width in ESR (mT) | | 29.0 | 37.5 | 22.3 | 22.0 | 24.5 | 31.1 | 37.5 |
| Line-width in ESR (mT) (calculated) | | 30.0 | 36.2 | 12.5 | 27.4 | 8.5 | 32.9 | 26.5 |
| Toluene discoloration T (%) | | 98 | 100 | 87.1 | 97 | 80 | 99 | 96.6 |
| $N_2SA$ | | 126 | 114 | 116 | 130 | 126 | 148 | 142 |
| Total amount of air used (temperature 500° C.) (kg/h) | | 5000 | 5000 | 5000 | 5000 | 5000 | 5000 | 5000 |
| Amount of hydrocarbon feed stock introduced (temperature 150° C.) (l/h) | | 938 | 950 | 948 | 950 | 955 | 845 | 840 |
| Amount of fuel introduced (LPG) (kg/h) | | 165 | 165 | 165 | 250 | 250 | 300 | 300 |
| Quenching locations (mm) | first quenching locations | 6000 | 5250 | 5250 | 3000 | 2250 | 1350 | 1200 |
| | second quenching location | — | 5850 | 5850 | — | 3150 | — | 1500 |
| Amount of quenching water (l/h) | first quenching locations | 1000 | 75 | 110 | 1000 | 200 | 1000 | 67 |
| | second quenching location | — | 925 | 880 | — | 800 | — | 933 |

| | | Example H | Example I | Comparative Example J | Example K | Example L | Comparative Example M |
|---|---|---|---|---|---|---|---|
| Line-width in ESR (mT) | | 27.8 | 24.1 | 32.0 | 20.8 | 20.0 | 21.0 |
| Line-width in ESR (mT) (calculated) | | 30.0 | 9.9 | 32.9 | 9.9 | 12.5 | 30.0 |
| Toluene discoloration T (%) | | 98 | 83.1 | 99 | 83.1 | 87.1 | 98 |
| $N_2SA$ | | 146 | 145 | 173 | 157 | 164 | 93 |
| Total amount of air used (temperature 500° C.) (kg/h) | | 5000 | 5000 | 5000 | 5000 | 5000 | 5000 |
| Amount of hydrocarbon feed stock introduced (temperature 150° C.) (l/h) | | 840 | 845 | 676 | 703 | 730 | 980 |
| Amount of fuel introduced (LPG) (kg/h) | | 300 | 300 | 180 | 250 | 180 | 180 |
| Quenching locations (mm) | first quenching locations | 1200 | 1200 | 1100 | 1200 | 1050 | 6300 |
| | second quenching location | 1500 | 1500 | — | 1500 | 1250 | — |
| Amount of quenching water (l/h) | first quenching locations | 67 | 108 | 1000 | 120 | 100 | 1000 |
| | second quenching location | 933 | 892 | — | 880 | 900 | — |

TABLE 4

| Comparative Example | Example | Example | Comparative Example | Comparative Example | Example | Comparative Example |
|---|---|---|---|---|---|---|

TABLE 4-continued

|  |  | 1 | 1 | 2 | 2 | 3 | 3 | 4 |
|---|---|---|---|---|---|---|---|---|
| Characteristics of carbon black | Kind | A | B | C | M | D | E | F |
|  | Line-width in ESR (mT) | 29.0 | 37.5 | 22.3 | 21.0 | 22.0 | 24.5 | 31.1 |
|  | Toluene discoloration T (%) | 98 | 100 | 87.1 | 98 | 97 | 80 | 99 |
|  | $e^{0.117\text{T}-7.56}+5$ | 30.0 | 36.2 | 12.5 | 30.0 | 27.4 | 8.5 | 32.9 |
|  | $N_2SA$ (m$^2$/g) | 126 | 114 | 116 | 93 | 130 | 126 | 148 |
|  | CTAB (m$^2$/g) | 115 | 114 | 115 | 90 | 122 | 120 | 135 |
|  | $_{24}M_4DB)$ (ml/100 g)) | 98 | 97 | 96 | 100 | 98 | 98 | 96 |
|  | $N_2SA$-CTAB (m$^2$/g) | 11 | 0 | 1 | 3 | 8 | 6 | 13 |
| Characteristics of rubber | Natural rubber | 100 | 100 | 100 | 100 | 100 | 100 | 100 |
|  | SBR 1500 *1 | — | — | — | — | — | — | — |
|  | Mooney viscosity | 67 | 60 | 60 | 61 | 69 | 64 | 83 |
|  | Wear resistance index *2 | 100 | 106 | 112 | 88 | 100 | 112 | 100 |
|  | Tan δ (indicated by index) *3 | 100 | 93 | 91 | 89 | 100 | 89 | 100 |

|  |  | Example 4 | Example 5 | Comparative Example 5 | Example 6 | Example 7 | Comparative Example 6 | Example 8 |
|---|---|---|---|---|---|---|---|---|
| Characteristics of carbon black | Kind | G | H | I | J | K | I | J |
|  | Line-width in ESR (mT) | 37.5 | 24.1 | 32.0 | 20.8 | 20.0 | 32.0 | 20.8 |
|  | Toluene discoloration T (%) | 96.6 | 83.1 | 99 | 83.1 | 87.1 | 99 | 83.1 |
|  | $e^{0.117\text{T}-7.56}+5$ | 26.5 | 9.9 | 32.9 | 9.9 | 12.5 | 32.9 | 9.9 |
|  | $N_2SA$ (m$^2$/g) | 142 | 145 | 173 | 157 | 164 | 173 | 157 |
|  | CTAB (m$^2$/g) | 133 | 137 | 157 | 156 | 158 | 157 | 156 |
|  | $_{24}M_4DB)$ (ml/100 g)) | 91 | 96 | 102 | 104 | 97 | 102 | 104 |
|  | $N_2SA$-CTAB (m$^2$/g) | 9 | 8 | 16 | 1 | 6 | 16 | 1 |
| Characteristics of rubber | Natural rubber | 100 | 100 | 100 | 100 | 100 | 50 | 50 |
|  | SBR 1500 *1 | — | — | — | — | — | 50 | 50 |
|  | Mooney viscosity | 78 | 77 | 104 | 82 | 95 | 95 | 89 |
|  | Wear resistance index *2 | 107 | 117 | 100 | 119 | 116 | 100 | 111 |
|  | Tan δ (indicated by index) *3 | 93 | 91 | 100 | 92 | 96 | 100 | 95 |

*1: Styrene butadiene copolymeric rubber made by Japan Synthetic Rubber Co., Ltd.
*2: The larger the value, the better the characteristic.
*3: the smaller the value, the better the characteristic.

From the results in Table 4, it is seen that the rubber compositions using the carbon black Satisfying the characteristic requirements according to the present invention (Examples 1-8) have smaller Mooney viscosity of their unvulcanized compositions and excellent wear resistance and heat generation properties of their vulcanizates as compared with those not satisfying these requirements. According to the present invention, processability, wear resistance and heat generation property are all improved.

As having been explained above, in the rubber composition of the present invention in which the carbon black satisfying the specific requirements is compounded into the diene based rubber, the Mooney viscosity of the unvulcanized product, as one of important factors in processability, can be suppressed to a low level with the greatly improved wear resistance and the heat generation property by using the carbon black as the reinforcing agent. Therefore, when the rubber composition according to the present invention can be applied to treads for various tires, and to rubber articles such as conveyor belts or hoses, particularly the wear resistance and heat generation property are improved. Thus, the invention can contribute to the improved performances of the articles. In addition, since the Mooney viscosity of the unvulcanized rubber composition is smaller and the processability is excellent as mentioned above, the merits are great in the production of the articles.

What is claimed is:

1. A rubber composition comprising at least one of natural rubber and a diene based synthetic rubber, and carbon black, wherein the carbon black has characteristics that a line-width $\Delta H$ (mT) in an electron spin resonance (ESR) satisfies $\Delta H$ (mT) $\geq e^{0.11T-2.56}+5$ wherein T is a toluene discoloration (%) in a range of $80\% \leq T \leq 95\%$ and an $N_2SA$ value of the carbon black is not less than 114 m$^2$/g to 250 m$^2$g.

2. The rubber composition according to claim 1, wherein a CTAB value and a $_{24}M_4DBP$ oil-adsorbed amount of the carbon black is not less than 105 m$^2$/g and not less than 85 ml/100 g, respectively.

3. The rubber composition according to claim 1, wherein a balance of {an N$_2$SA value (m$^2$/g) - a CTAB value (m$^2$/g)} is not more than 10 m$^2$g.

4. The rubber composition according to claim 2, wherein a balance of {an N$_2$SA value (m$^2$/g) - a CTAB value (m$^2$/g)} is not m ore than 10 m$^2$g.

5. A pneumatic tire containing a rubber composition comprising at least one of natural rubber and a diene based synthetic rubber, and carbon black, wherein the carbon black has characteristics that a line-width $\Delta H$ (mT) in an electron spin resonance (ESR) satisfies $\Delta H$ (mT)$\geq e^{0.11T-7.56}+5$ wherein T is a toluene discoloration (%) in a range of 80%$\leq T \leq$95%, and an N$_2$SA value of the carbon black is not less than 114 m$^2$/g to 250 m$^2$/g.

6. The pneumatic tire according to claim 5, wherein said toluene discoloration is in a range of 80% $\leq T \leq$ 87.1%.

7. The rubber composition according to claim 1, wherein said toluene discoloration is in a range of 80%$\leq T \leq$87.1%.

* * * * *